US006639037B2

(12) United States Patent
Van Swieten et al.

(10) Patent No.: US 6,639,037 B2
(45) Date of Patent: Oct. 28, 2003

(54) CONTINUOUS DOSING OF VERY FAST INITIATORS DURING POLYMERIZATION REACTIONS

(75) Inventors: Andreas Petrus Van Swieten, Velp (NL); Hans Westmijze, Bathmen (NL); Jacobus Schut, Deventer (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/022,312

(22) Filed: Dec. 14, 2001

(65) Prior Publication Data

US 2002/0123591 A1 Sep. 5, 2002

Related U.S. Application Data

(62) Division of application No. 09/787,729, filed as application No. PCT/EP99/06728 on Sep. 10, 1999, now Pat. No. 6,384,155.

(30) Foreign Application Priority Data

Sep. 21, 1998 (EP) .............................. 98203176

(51) Int. Cl.[7] .............................. C08F 114/06
(52) U.S. Cl. ................... 526/344.2; 526/345
(58) Field of Search ............... 526/344.2, 345

(56) References Cited

U.S. PATENT DOCUMENTS

| 3,324,097 A | * | 6/1967 | Pears | |
| 3,451,985 A | | 6/1969 | Mahlo | |
| 3,627,717 A | * | 12/1971 | Kuhnen | |
| 3,696,083 A | * | 10/1972 | Hwa | |
| 5,378,780 A | * | 1/1995 | Kruse | .......... 526/212 |
| 5,739,222 A | | 4/1998 | Kobayashi et al. | .......... 526/87 |

FOREIGN PATENT DOCUMENTS

| EP | 096 365 | 12/1983 | ......... C08F/214/06 |
| EP | 492 712 A1 | 7/1992 | ......... C08F/2/20 |
| EP | 717 035 A1 | 6/1996 | ......... C07C/409/38 |
| JP | 7292018 | 11/1995 | ......... C08F/4/34 |

OTHER PUBLICATIONS

Derwent No. 96–017232 Abstract of Japan Patent 7292018A, Nov. 7, 1995.

Derwent No. 95–158997/21 Abstract of Japan Patent 0708304–A, Mar. 28, 1995.

* cited by examiner

Primary Examiner—Bernard Lipman
(74) Attorney, Agent, or Firm—Richard P. Fennelly

(57) ABSTRACT

The invention pertains to a process wherein peroxides are dosed to a polymerization mixture, with essentially all of the organic peroxide that is used in the polymerization process having a half-life from 0.05 hour to 1.0 hour at the polymerization temperature. The dosing of such peroxide allows for accurate control of the polymerization rate, and the process will render a polymer with a low residual peroxide level.

6 Claims, No Drawings

CONTINUOUS DOSING OF VERY FAST INITIATORS DURING POLYMERIZATION REACTIONS

This application is a divisional of U.S. Ser. No. 09/787,729, filed Jul. 16, 2001, now U.S. Pat. No. 6,394,155, which application is a national phase filing of PCT/EP99/06728, having an international filing date of Sep. 10, 1999 and which claims priority from European Patent Application Serial No. 98203176.7, filed Sep. 21, 1998.

BACKGROUND OF THE INVENTION

1. Field of the Invention

The present invention relates to a process to polymerize one or more monomers by means of one or more organic peroxides being dosed to the polymerization mixture at the reaction temperature.

2. Description of Related Art

Such a process is known from DE-OS-1 570 963. Herein it is taught to dose an initiator, optionally mixed with a solvent, to the composition being polymerized via a stream of water. The organic peroxides that are exemplified in this patent application are peroxydicarbonates and acetyl-cyclohexyl-sulfonyl-peroxide (ACSP). They are used at a temperature of 54° C. The half-life of peroxy-dicarbonates at 54° C. is known to vary from about 3.5 to 4.5 hours, depending on the type of peroxydicarbonate used.

This process of DE-OS-1 570 963 was found to solve a number of problems in the industry. However, the process still suffers from insufficient control of the heat peak of the polymerization reaction, a related less than optimal use of the reactor, a rather poor initiator efficiency, high residual peroxide levels in the resin produced, especially of the peroxydicarbonates, and/or the use of an undesirable initiator like ACSP which is known to lead, inter alia, to undesired fish eyes in the resin. A high residual peroxide concentration, especially of ACSP, is considered to correlate with a poor thermal stability of the resin containing it, which in turn is associated with a discolouration of the resin upon further processing. Accordingly, a different process not suffering from these drawbacks is desired.

Similarly, EP-A-0 096 365 discloses how a peroxide is added in three parts during the polymerization. Again, difficulties in controlling the heat that is subsequently generated are reported.

BRIEF SUMMARY OF THE INVENTION

The current invention relates to a new process wherein these problems have largely been solved. More particularly, we have found that by selecting the proper organic peroxide and the proper dosing conditions, it is possible to obtain a polymerization reaction where the heat of polymerization is virtually constant over time, allowing optimum reactor space-time yield, very efficient peroxide usage, resulting in high polymer yields on the initiator, very low residual peroxide levels in the resin after polymerization, low fish-eye levels in the resin, and low reactor fouling. Accordingly, a resin with improved heat stability properties and low fish-eye levels was obtained, while the polymerization time could be shortened.

DETAILED DESCRIPTION OF THE INVENTION

The new process is characterized in that essentially all of the organic peroxide used in the polymerization process has a half-life from 0.05 hour to 1.0 hour at the polymerization temperature. This allows for accurate control of the polymerization rate and related polymerization heat generation by controlling the peroxide dosing rate, while also resulting in a high yield of resin with low levels of residual peroxide and low fish-eyes.

The process according to the invention is preeminently suited to polymerize monomer mixtures comprising vinyl chloride monomer (VCM). Preferably, the process according to the invention involves the polymerization of monomer mixtures comprising at least 50% by weight (% w/w) of VCM, based on the weight of all monomer.

Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

In the process according to the invention, one or more peroxides may be used, as long as essentially all peroxides that are used fulfill the half-life requirement. It is noted that in JP-A-07082304 also a peroxide with a half-life within the range of 0.05–1.0 hour at polymerization temperature is dosed. However, according to this reference, another, more stable, peroxide is used from the start of the polymerization. This more stable peroxide does not fulfill the specified half-life requirement, and we have observed that the resulting resin contains an unacceptably high residue of this peroxide and, accordingly, will suffer from poor heat stability, which is typically observed in the form of discolouration during further processing of the resin.

Preferred examples of peroxides to be used in the process according to the invention are the following:

1,1,3,3-tetramethylbutylperoxy methoxy acetate, for polymerization reactions at 35–50° C., preferably 40–45° C.

diisobutanoylperoxide, bis(tert-butylperoxy)oxalate or 2,2-bis(2,2-dimethylpropanoyiperoxy)-4-methyl pentane, for polymerization reactions at 40–65° C., preferably 45–60° C.

α-cumyl peroxyneodecanoate, 2-(2,2-dimethylpropanoylperoxy)-2-(2-ethylhexanoyiperoxy)-4-methyl pentane or 2,4,4-trimethylpentyl-2-peroxyneodecanoate, at polymerization temperatures of 53–79° C., preferably 60–75° C., and tert-amyl, tert-butyl peroxyneodecanoate or peroxydicarbonates, at polymerization temperatures of 58–87° C., preferably 75–80° C.

Other peroxides may also be used. They can be classified into any of the above-mentioned categories on the basis of the 0.05 and 1.0 hour half-lives as determined by conventional thermal decomposition studies in monochlorobenzene, as well-known in the art (see for instance the brochure "Initiators for high polymers" with code 10737 obtainable from Akzo Nobel). As mentioned above, the process according to the invention requires that essentially all peroxide be used at a polymerization temperature at which the half-life of the peroxide is from 0.05 hour to 1.0 hour. More preferably, essentially all peroxide that is used has a half-life of 0.05 to 0.8 hour, even more preferably 0.08 to 0.5 hour, most preferably 0.08 to 0.35 hour, at the polymerization temperature.

In a preferred embodiment, the invention relates to a process wherein the polymerization mixture is formulated at a temperature below the reaction (polymerization) temperature and subsequently heated to reach said desired reaction temperature. In such a cold-start process preferably at least 10% by weight (% w/w), more preferably 20 to 40% w/w, of the peroxide, based on the total weight of the peroxide used during the polymerization, is present at the start of the heating-up phase, while the remainder is dosed over a period of at least 1, preferably 2, and more preferably 2–4 hours, depending on the polymerization time. More preferably, the remainder of the peroxide is dosed from the time the reaction mixture temperature is controlled at the desired reaction temperature. The use of a small amount of peroxide from the start allows a fast heating up and start of the polymerization, since this peroxide will already (partly) decompose during the heating of the polymerization mixture. When the polymerization mixture reaches the polymerization temperature, the remainder of the peroxide can be dosed to the mixture to control the further polymerization rate. Preferably, the dosing is continuous, since this allows the most accurate control of the polymerization rate and a constant polymerization heat output, ensuring the highest efficiency and resin quality. The dosing time of 1–6 hours allows a very efficient use of the initiator. By using such dosing times, high yields of high-quality polymer were attained.

In another preferred embodiment, the reaction mixture is formulated at or near the polymerization temperature. In this process, hereinafter called warm-start process, it is not necessary to add a certain amount of peroxide at the start while the remainder is dosed over time. However, also in this warm-start process it can be beneficial to add up to 20% w/w of all peroxide immediately after formation of the reaction mixture, the remainder being dosed over time. Also in this warm-start process preferably at least 10% w/w of all peroxide is present from the moment the reaction mixture reaches the desired reaction (polymerization) temperature. If this procedure is used, the peroxide according to the invention preferably is added as the last ingredient. This procedure is particularly preferred if a certain amount of polymerization inhibitor (a radical trapping species) is present in the reaction mixture. If such a radical scavenger is present, for instance because it is introduced with the monomer wherein it is typically used as a stabilizer, the initially dosed peroxide will react with said scavenger, thus preventing a delayed start of the polymerization reaction.

The amount of peroxide to be used in a process according to the invention is within the range conventionally used in polymerization processes. Typically, from 0.01 to 1% w/w of peroxide, more specifically 0.01–0.5% w/w, based on the weight of the monomer(s) to be polymerized, is used.

The peroxide is dosed to the reactor in the pure form or, preferably, in the form of a dilute solution or dispersion. One or more suitable solvents can be used to dilute the peroxide. Preferably, such solvents are easily removed during the steps working up the polymer after the polymerization process, or they are of such a nature that it is acceptable to leave them as a residue in the final polymer. Furthermore, such solvents preferably do not adversely affect the thermal stability of the peroxide dissolved therein, as can be verified by analyzing the half-life temperature of the peroxide in said solvent. An example of a suitable solvent is isododecane. If a peroxide dispersion is dosed, then the dispersion can be of either the peroxide itself or of a solution of the peroxide, preferably in said suitable solvents. Preferably, the dispersion is an aqueous dispersion. Preferably, the peroxide is dosed in a concentration of 1 to 50% w/w, more preferably 1.5 to 25% w/w, and most preferably 2 to 10% w/w. The more dilute peroxide solutions or dispersions ensure rapid mixing of the peroxide and the polymerization mixture, which leads to a more efficient use of the peroxide.

The polymerization process can be conducted either as a mass process wherein the reaction mixture is predominantly monomer or as a suspension process wherein the reaction mixture typically is a suspension of monomer in water, or as an emulsion or micro-emulsion process wherein the monomer typically is emulsified in water. In these processes the usual additives will have to be used. For example, if the monomer is present in the form of a suspension in water, the usual additives like surfactant(s), protective colloid(s), antifouling agent(s), pH-buffer(s), etc. may be present. Depending on the type of polymer desired, each of the abovementioned processes may be preferred. The process according to the invention is especially suited for mass and suspension processes.

After the polymerization, the resulting (co)polymer (or resin) will be worked up as is usual in the art. Polymers obtained by a suspension polymerization according to the invention, for example, will be submitted to the usual drying and screening steps. The resulting resin preferably is characterized in that it contains less than 50 ppm of residual peroxide, more preferably less than 40 ppm, and most preferably, less than 25 ppm of peroxide, immediately after drying for 1 hour at 60° C. and screening. The resin was found to exhibit excellent heat stability as measured with a Metrastat® PSD260 testing oven according to method ISO 182-2 (1990E). The improved heat stability proved that the resin hardly discoloured when submitted to melt-processing steps, e.g., to form shaped articles.

Experimental

In a standard suspension polymerization experiment, a temperature controlled 5-liter stainless steel Büchi reactor provided with one baffle, a three-bladed stirrer, a pressure transducer, a VCM feed line, a nitrogen purge line, and a sampling line for taking samples from the gas phase, was charged with:

2600 g demineralized water,
1 g $Na_2HPO_4$ and 1 g $NaH_2PO_4$ buffer (ex Baker),
and pressurized to 15 barg, using nitrogen. If no leaks are observed, the reactor is evacuated and pressurized with nitrogen up to 5 barg three times to flush out virtually all air. If not all peroxide is dosed, then the desired amount of peroxide is added. Next, the reactor was evacuated and charged with 675 g VCM ex Akzo Nobel Salt & Basics and 3.4 g n-butane ex Praxair (first mixed with the VCM), followed by heating up of the reactor, so that the reaction mixture was at the desired polymerization temperature after one hour. Ten minutes after starting the heating, a solution of 1.0125 g of Gohsenol KP-08 ex Nippon Gohsei in 100 g demineralized water was added to the reaction mixture. From this moment on the conversion was monitored by analyzing the gas phase of the reactor, as is known in the art. After a pressure drop in the reactor, or 7.5 hours reaction time, whichever is shorter, the polymerization was continued for another half hour, and then the reactor was cooled to 20–25° C., evacuated and freed of virtually all remaining VCM. The polymer was obtained after filtration, washing, and drying (at 60° C. for 1 hour using a fluidized bed).

The peroxides used, the amount dosed, and the polymerization results are presented in the following tables I–VII. The heat peak height correlates with the maximum slope of the conversion/time curve. The higher the heat peak, the more heat is being generated at a certain time and the more difficult it will be to control the temperature of the reaction mixture. A low heat peak together with high polymer yields is preferred, since then an optimum in the space-time yield of the reactor can be attained. Unless specified otherwise, the peroxide is dosed from of the start of the heating up.

TABLE I

| Example | 1 | A |
|---|---|---|
| Initiator | 2,4,4-trimethylpentyl-2-peroxymethoxyacetate | |
| half-life at 42° C. | 0.21 hour | |
| Amount | 0.1% w/w on VCM | |
| Dosing form | Diluted with 100 g isododecane | n.r. |
| Added at start/dosed (weight ratio) | 0/100 | 100/0 |
| Dosing time (hours) | 3 | n.r. |
| Polymerization temperature (° C.) | 42 | 42 |
| Heat peak height | 55 | 20 |
| Polymer yield (%) | 90 | Too low (<<90) | n.r. = not relevant

TABLE II

| Example | 2 | 3 | B |
|---|---|---|---|
| Initiator | Diisobutanoyl peroxide (Trigonox 187-C30 ex Akzo Nobel) | | |
| half-life at 57° C. | 0.1 hour | | |
| Amount | 0.1% w/w on VGM | | |
| Dosing form | diluted with 100 g isododecane | | n.r. |
| Added at start/dosed (weight ratio) | 0/100 | 0/100 | 100/0 |
| Dosing time (hours) | 2 | 4 | n.r. |
| Polymerization temperature (° C.) | 57 | 57 | 57 |
| Heat peak height | 74 | 78 | 5 |
| Polymer yield (%) | 80 | 90 | 46 |

TABLE III

| Example | 4 | 5 | C |
|---|---|---|---|
| Initiator | 2,4,4-trimethylpentyl-2-peroxy neodecanoate (Trigonox 423-C70 ex Akzo Nobel) | | |
| half-life at 72° C. | 0.13 hour | | |
| Amount | 0.05% w/w on VCM | | |
| Dosing form | diluted with 100 g isododecane | | n.r. |
| Added at start/dosed (weight ratio) | 0/100 | 0/100 | 100/0 |
| Dosing time (hours) | 0.17 | 4 | n.r. |
| Polymerization temperature (° C.) | 72 | 72 | 72 |
| Heat peak height | 39 | 45 | 25 |
| Polymer yield (%) | 68 | 83 | 40 |

TABLE IV

| Example | 6 | D |
|---|---|---|
| Initiator | Bis(tert.butylperoxy) oxalate | |
| half-life at 57° C. | 0.16 hour | |
| Amount | 0.075% w/w on VCM | |
| Dosing form | diluted with 100 g isododecane | n.r. |
| Added at start/dosed (weight ratio) | 0/100 | 100/0 |
| Dosing time (hours) | 2 | n.r. |
| Polymerization temperature (° C.) | 57 | 57 |
| Heat peak height | 75 | 18 |
| Polymer yield (%) | 79 | Too low |

TABLE V

| Example | 7 | 8 | 9 | E |
|---|---|---|---|---|
| Initiator | Tert-butyl peroxyneodecanoate (Trigonox 23-C75 ex Akzo Nobel) | | | |
| half-life at 80° C. | 0.15 hour | | | |
| Amount | 0.05% w/w on VCM | | | |
| Dosing form | diluted with 100 g isododecane | | | n.r. |
| Added at start/dosed (weight ratio) | 0/100 | 0/100 | 0/100 | 100/0 |
| Dosing time (hours) | 0.42 | 2 | 4 | n.r. |
| Polymerization temperature (° C.) | 80 | 80 | 80 | 80 |
| Heat peak height | 29 | 67 | 57 | 43 |
| Polymer yield (%) | 58 | 77 | 87 | 66 |

Clearly, a proper selection of the dosing time influences the yield attainable. It was furthermore observed that in these trials, in which fouling of the reactor surface is typically noticeable, due to inter alia the high temperature of the reactor wall, less fouling was observed in the runs where the peroxide was dosed in 2 or 4 hours.

TABLE VI

| Example | 10 |
|---|---|
| Initiator | 2,2-bis-(2,2-dimethylpropanoylperoxy)-4-methyl pentane |
| half-life at 53° C. | 0.18 hour |
| Amount | 0.12% w/w on VCM |
| Dosing form | diluted with 100 g isododecane n.r. |
| Added at start/dosed (weight ratio) | 42/58 |
| Dosing time (hours) | 1 hour after start of heat-up in 2 hours |
| Polymerization temperature (° C.) | 53 |
| Heat peak height | 39 |
| Polymer yield (%) | 88 |

TABLE VII

| Example | 11 | F |
|---|---|---|
| Initiator | Trigonox 187-C30 | di-2-ethylhexylperoxy dicarbonate (Trigonox EHP-C70) and Trigonox 187-C30 |
| half-life at 57° C. | 0.1 hour | 3.1 and 0.1 hour respectively |
| Amount | 0.1% w/w on VCM | 0.06% w/w on VCM |
| Dosing form | diluted with 100 g isododecane | |
| Added at start/dosed (weight ratio) | 40/60 | 0.05% w/w EHP at start 0.01% w/w 187 dosed (83/17) |
| Dosing time (hours) | 15 minutes after start of heat-up in 3 hours | 2.5 hours after start of heat-up in 1 hour |
| Polymerization temperature (° C.) | 57 | 57 |
| Heat peak height | 34 | 45 |

TABLE VII-continued

| Example | 11 | F |
|---|---|---|
| Polymer yield (%) | 81 | 90 |
| Residual peroxide | <32 ppm* | 150 ppm** |

*= in final resin, as measured by iodometric titration on active oxygen, expressed as Trigonox 187, immediately after frying and screening.
**= in final resin, as measured by iodometric titration on active oxygen, expressed as Trigonox EHP, immediately after drying and screening.

What is claimed is:

1. Vinylchloride based (co)polymer obtained by using one or more organic peroxides, with at least part of the peroxide being dosed to the polymerization mixture at a reaction temperature of from about 35° C. to about 87° C., characterized in that essentially all of the organic peroxide used in the polymerization process has a half-life of from 0.05 hour to 1.0 hour at the polymerization temperature and that said peroxide is dosed, continuously or discontinuously, over a period of 0.17 hours or longer, with the proviso that the polymerization is not the copolymerization of vinyl chloride monomer and propylene using α-cumyl peroxyneodecanoate as the initiator, the vinylchloride based (co)polymer having less than 50 parts by weight of residual peroxide, based on one million parts by weight of the (co)polymer, when measured immediately after polymerization and drying of the (co)polymer for 1 hour at 60° C.

2. A (co)polymer according to claim 1 wherein the peroxide dosed at the reaction temperature is dosed continuously.

3. A (co)polymer according to claim 1 wherein at least 10% w/w of the total amount of initiator is present at the start of the polymerization reaction, either before the reaction mixture is heated up to the desired reaction temperature, as in a cold-start process, or when the temperature of the reaction mixture is at said reaction temperature, as in warm-start processes.

4. A (co)polymer according to claim 2 wherein at least 10% w/w of the total amount of initiator is present at the start of the polymerization reaction, either before the reaction mixture is heated up to the desired reaction temperature, as in a cold-start process, or when the temperature of the reaction mixture is at said reaction temperature, as in warm-start processes.

5. A (co)polymer according to claim 3 wherein 10–40% w/w, of the total amount of peroxide is present at the start of the polymerization process.

6. The use of a vinyl chloride (co)polymer according to any of claims 1 to 5 in a shaping process involving the heating of the co(polymer) to above its melting temperature.

* * * * *